Patented Jan. 1, 1924.

1,479,768

UNITED STATES PATENT OFFICE.

THOMAS W. WOODWARD, OF COLLINSVILLE, ILLINOIS.

PAINT COMPOSITION.

No Drawing. Application filed May 4, 1922. Serial No. 558,526.

*To all whom it may concern:*

Be it known that I, THOMAS W. WOODWARD, a citizen of the United States, residing at Collinsville, in the county of Madison and State of Illinois, have invented certain new and useful Improvements in Paint Compositions; and I do declare the following to be a full, clear, and exact description of the invention, such as will enable others skilled in the art to which it appertains to make and use the same.

This invention relates generally to liquid coating compositions, and particularly to a paint or paint composition having improved and desirable qualities.

The improved paint composition has been designed especially for coatng metal surfaces in order to prevent rusting thereof, and to coat packing house tanks and apparatus in order to resist the action of the acids formed by the decomposition of animal matter.

The improved paint composition consists of paraffin oil, black oil, which is sometimes called summer black oil and which is a low grade lubricating oil and a mineral product, gloss oil, Japan drier, plaster of Paris, lamp black and graphite. Of these ingredients, paraffin oil, black oil, gloss oil, Japan drier, and plaster of Paris constitute the base composition. The lamp black and graphite are used as coloring substances to produce a black color. If another color is desired, then the lamp black and graphite may be omitted or substituted by other coloring materials, but the coloring matter may be omitted in the preparation of the base composition.

In preparing a batch of the improved composition, the ingredients are preferably mixed together or combined in the proportions of four pints of paraffin oil to two pints of the black oil, to two pints of the gloss oil, to one pint of Japan dryer, to one-half a pound of plaster of Paris, to one-third of a pound of lamp black, to one-fifth of a pound of pulverized graphite.

The composition is preferably produced by first mixing the dry pigments, that is, the plaster of Paris and the lamp black with the paraffin oil. The graphite is preferably pulverized and it is preferable to use 90% of an air floated graphite cut with 10% silica. The graphite is then added to the paraffin oil. After the dry pigments and the graphite have been added to the paraffin oil, the black oil, gloss oil and Japan dryer are then added and the whole is then mixed thoroughly.

The composition may be applied to surfaces to be coated therewith in the usual manner and when it is applied to metal, it will prevent rusting of the latter. As hereinbefore stated, the composition will therefore be especially adapted for coating the tanks and apparatus of packing houses in order to resist the action of acids which are formed by the decomposition of animal matter.

Although the preferred ingredients have been specified and the most suitable proportions in which they may be combined have also been specified, yet it is obvious that substantially the same results may be obtained by varying the proportions of the ingredients from those herein specified, and by substituting equivalent substances for the herein named ingredients, and hence it is to be understood that such variation is permitted within the meaning and scope of the appended claims.

I claim:

1. A paint composition including paraffin oil, a low grade lubricating oil, gloss oil, Japan dryer, plaster of Paris and coloring material.

2. A paint composition including paraffin oil, black oil, gloss oil, Japan dryer, plaster of Paris and coloring material.

3. A paint composition composed of paraffin oil, black oil, gloss oil, Japan dryer, plaster of Paris, lamp black and graphite.

4. A paint composition composed of paraffin oil, black oil, gloss oil, Japan dryer, plaster of Paris, lamp black and graphite mixed together in substantially the proportions of four pints of paraffin oil, to two pints of black oil, to two pints of gloss oil, to one pint of Japan dryer, to one-half pound of plaster of Paris, to one-third pound of lamp black, to one-fifth pound of graphite.

5. A base composition for paints including paraffin oil, black oil, gloss oil, plaster of Paris and Japan dryer.

6. A base composition for paints including paraffin oil, black oil, gloss oil, plaster of Paris and Japan dryer, mixed together in the proportions of four pints of paraffin oil, to two pints of black oil, to two pints of gloss oil, to one-half pound of plaster of Paris, to one pint of Japan dryer.

7. A base composition for paints including paraffin oil, a low grade lubricating oil, gloss oil, plaster of Paris and Japan dryer.

In testimony whereof I have hereunto set my hand.

THOMAS W. WOODWARD.